Dec. 27, 1966 A. R. MAXEY 3,294,902

FAST, SLOW AND STOP MOTION REPRODUCTION USING LONGITUDINAL RECORDING AND ROTATING HEADS

Filed Dec. 30, 1963 3 Sheets-Sheet 1

ALEXANDER R. MAXEY
INVENTOR.

BY Robert G. Clay

ATTORNEY

ALEXANDER R. MAXEY
INVENTOR

BY Robert G. Clay

ATTORNEY

ALEXANDER R. MAXEY
INVENTOR.
BY Robert G. Clay
ATTORNEY

United States Patent Office 3,294,902

Patented Dec. 27, 1966

3,294,902

FAST, SLOW AND STOP MOTION REPRODUCTION USING LONGITUDINAL RECORDING AND ROTATING HEADS

Alexander R. Maxey, Mountain View, Calif., assignor to Ampex Corporation, Redwood City, Calif., a corporation of California Filed Dec. 30, 1963, Ser. No. 334,492
6 Claims. (Cl. 178—6.6)

This invention relates to a magnetic recording and reproducing system, and more particularly to a magnetic recording and reproducing system wherein the frequencies of certain portions of the input signal may be altered without altering the frequencies of other portions of the signal.

Various video recording and reproducing systems have been used extensively as a means for recording visual events for later use in television presentations. These various systems, and in particular the magnetic tape systems, offer the obvious advantage of permitting the television signals to be recorded directly for later playback. Because of the many advantages offered by video tape recording systems, they are now widely used for entertainment, advertising and remotely recorded program material. However, because of the nature of television signals and the manner in which they are recorded, it has previously been considered impractical or uneconomic to achieve fast and slow motion effects with video tape systems. Accordingly, motion picture techniques have remained the principal method of producing such fast and slow motion effects. In present television systems, composite television signals define a continuous series of frames, each frame containing a pair of interlaced "fields," and each field containing signals corresponding to a full scan of the television screen. The fields are identified by vertical sync pulses and the video signal within each field is interspersed with horizontal sync pulses which separate adjacent lines of the television picture. The television receiver contains internal synchronizing circuits that are designed to operate in response to the vertical and horizontal sync signals to produce an orderly scan of the television screen. Obviously, fast and slow motion effects cannot be achieved by simply changing the speed at which a tape recorded video signal is reproduced because this changes the frequency of the video signal itself and introduces substantial timing differences in the synchronizing pulses. In other words the frequency represented by the overall time length of the recorded event must be changed in order to obtain slow or fast motion effects, but without altering the frequencies of the synchronizing pulses.

In the allied fields of standards conversion, a converse requirement exists. For example, British television programs are presented at 25 frames per second, while the U.S. standard is 30 frames per second. In order to prepare a U.S. program for British broadcast, the equivalent of 5 frames out of each 30 must be deleted without altering the apparent speed of motion or the elapsed time of the action recorded.

In the general field of magnetic recording, and especially in the field of instrumentation recording and reproducing, it is often desirable to alter the time base or frequency of an input signal without changing the length of time required for reproduction, or vice versa.

Accordingly, it is an object of the present invention to provide means for altering the frequencies of selected portions of an input signal without altering the frequencies of other portions of the signal.

It is another object of the present invention to provide a video recording and reproducing system capable of achieving fast and slow motion effects directly from a recorded video signal without changing the frequency of the video signals at the head.

Another object of this invention is to provide a tape recording and reproducing system for video signals which is capable of achieving fast and slow motion effects in the reproduced signal without deviating from the frequency or frame rate of the recorded signal at the head.

A further object of this invention is to provide a magnetic tape recorder capable of recording successive frames of information on the tape at a variable frame rate, but without altering the apparent speed of motion of the recorded action.

These and other objects may be accomplished in accordance with the invention by providing a pair of magnetic head transducers mounted upon the periphery of a drum that is disposed to rotate in a plane adjacent the longitudinal recording track of a section of magnetic tape. The tape is driven by conventional means between supply and takeup-reels in a path including a semi-circular tape support member partly encompassing the rotating magnetic heads. A driving means is provided to advance the magnetic tape at a variable speed while at all times maintaining the peripheral velocity of the rotating magnetic heads on the drum at a fixed speed above that of the tape and in the same direction of movement. This fixed speed differential between the magnetic heads and the tape is determined by the frame interval of the composite television signal and is equal to the peripheral velocity of the drum when rotating at a speed to complete a full revolution during each frame interval.

In the recording mode of operation, the longitudinal speed of the tape is made equal to the fixed speed differential maintained between the tape and the magnetic heads, so that the magnetic heads move at an absolute speed which is twice the fixed speed differential. The section of tape held by the tape support members provides an arc which is slightly more than a semicircle around the rotating heads. Thus, during a small portion of each rotation, each of the oppositely disposed heads is in operative contact with a respective portion of the tape during the same overlap interval. The incoming composite television signal is applied in alternating fashion to one and then the other of the magnetic heads, with an electronic switching circuit being actuated as each head comes into an operative position adjacent the section of magnetic tape in the area of tape overlap. This switching circuit may be made responsive to the vertical synchronizing pulses at the beginning of each frame so that the switching of the signal between the heads may be achieved in the blanking interval between adjacent frames. The result of the recording operation is that the video components within each frame are recorded on the tape in the direction of tape travel, rather than being recorded on the tape in the direction of tape travel, rather than being recorded in a direction opposite to the tape travel as in conventional tape recording systems. The successive individual frames, on the other hand, are recorded on the tape in the order of their occurrence in the conventional direction which is opposite to the direction of tape travel.

In accordance with the invention, the speed of the motor which drives the magnetic tape may be varied while maintaining the predetermined speed differential between the tape and the peripheral velocity of the head. Circuitry is provided for switching between magnetic heads in response to a horizontal synchronizing pulse occurring during the interval in which magnetic heads are located in the area of tape overlap. Therefore, due to the order in which the video frames have been previously recorded, the signal is reproduced by one head up to a given point in one of the recorded frames and then switched to the other head which begins reproducing the recorded signal at the same point in time in a succeeding frame. Thus, the reproduced signal contains video frames with conventional intervals between vertical sync pulses and the same frequencies as were recorded, because the same relative speed is held between the magnetic heads and the tape.

For "stop motion" or "reverse motion" reproduction, the tape may be held stationary or reversed in motion, so long as there is relative movement of the heads with respect to the tape in the same vector direction and at the same differential speed as obtained during recording. At certain reverse motion speeds of the tape, the heads may therefore be stationary with respect to ground or chassis, or even rotating reversely. An advantage of "reverse motion" operation of the present invention is that the picture presented is not inverted.

For increasing the rate of fast motion, the tape may first be recorded in slow motion and then played back in fast motion, resulting in even faster apparent motion. An analogous effect may be achieved in slow motion. Tapes recorded in slow or fast motion may also be played back at normal speed with the change in apparent motion permanently preserved.

For use in standards conversion, the recorded tape during reproduction may be moved at normal recording speed but the heads may be slowed or speeded to give a different frame rate, with the resulting alterations in the frequencies of the synchronizing pulses and video signal being compensated for by means of other mechanisms well known in the art.

A better understanding of the invention may be had by reference to the following description, taken in conjunction with the accompanying drawings, in which.

Figure 1:
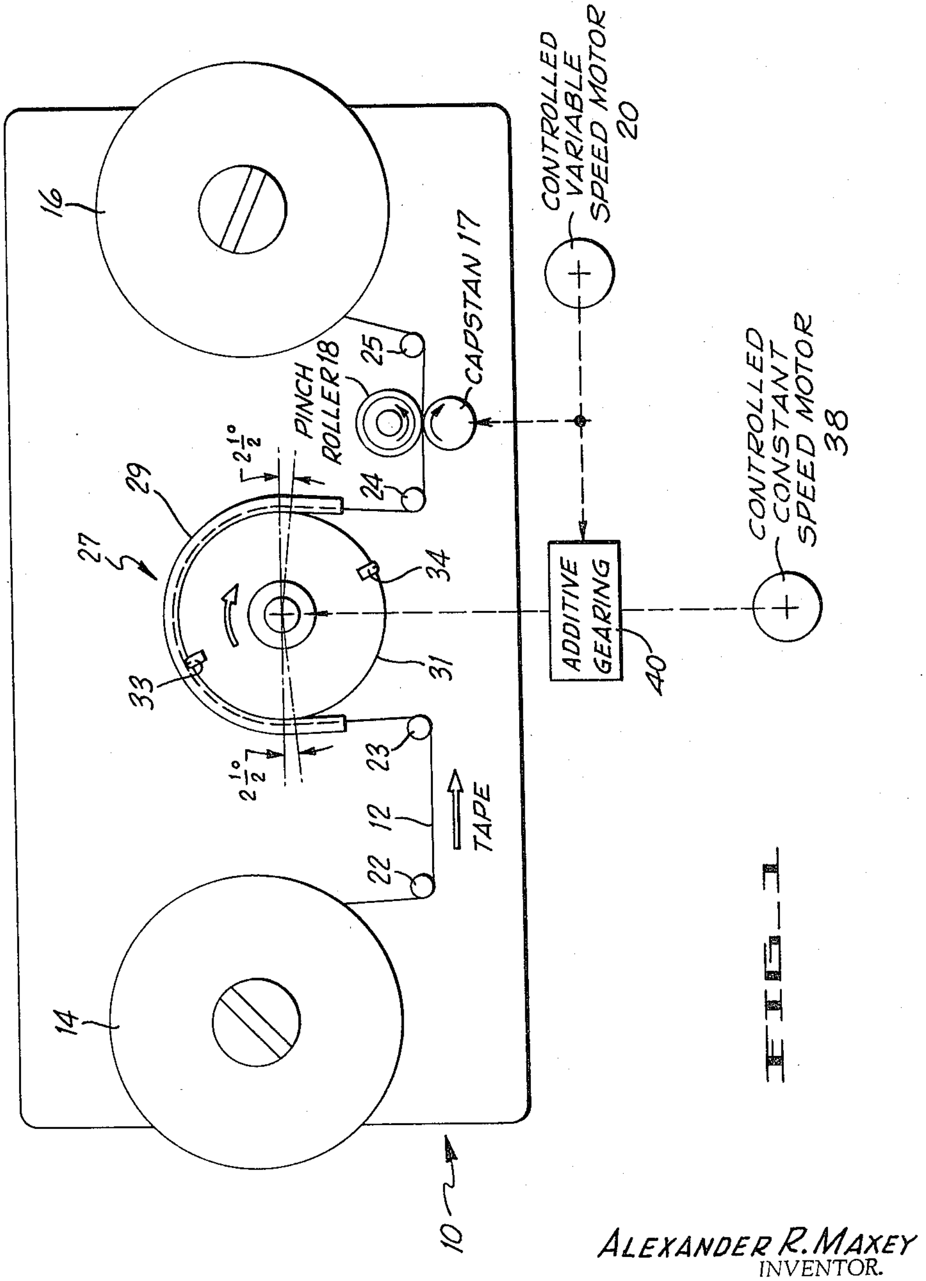
FIGURE 1 is a simplified plan view of a recording and reproducing system in accordance with the invention.

The principal mechanical elements of a recording and reproducing system in accordance with the invention are illustrated in simplified form in FIGURE 1. While the invention will be described herein in connection with a magnetic tape recording system, it will be understood by those skilled in the art that the invention is applicable to other recording and reproducing systems wherein different recording media, such as magnetic drums and electrostatic tapes, are employed.

A magnetic tape 12 is moved along an operative tape path between a tape supply reel 14 and a tape take-up reel 16 by any conventional means, which in this case consists of a rotating capstan 17 against which the tape is urged by a pinch roller 18. A variable speed control motor 20 is coupled to the capstan 17 so that the tape 12 may be moved longitudinal along the path at any desired speed.

Guide rollers 22, 23, 24 and 25 retain the tape 12 within linear paths on either side of a transducer assembly 27, which includes a substantially semicircular tape support member 29 and a rotating magnetic head drum 31. A pair of recording and reproducing magnetic heads 33 and 34 are mounted directly opposite one another on the periphery of the rotating drum 31 so that they rotate within the circular arc formed by the tape guide member 29. The circular arc of the tape guide member 29 extends slighlty more than a semicircle, and the central roller guides 23 and 24 are spaced apart on either side at a distance from one another which is slightly less than the diameter of the tape guide member 29. Thus a circular length of tape is disposed in an arc slightly more than a semicircle adjacent the magnetic heads 33 and 34. The tape support member 29 may be of a non-magnetic material and exhibit a low coefficient of friction to the movement of the magnetic tape along its outer surface. A slot 36 may be provided along the curved surface of the tape support member 29 to ensure good operative contact between the magnetic heads 33 and 34 and the longitudinal recording track on the tape 12.

The variable speed motor 20 and a controlled constant speed motor 38 are coupled through an additive gearing arrangement 40 or other suitable means to drive the drum 31 at a rotational speed corresponding to the sum of the speeds of the two motors. In accordance with the invention, the drum 31 is driven through the additive gearing 40 so that the magnetic heads 33 and 34 travel at a fixed differential speed in excess of the longitudinal speed of the tape 12. Thus, during operation in either the record or the reproduce mode the magnetic heads 33 and 34 sweep the section of tape disposed on the tape support means 29 at the same relative speed and in the direction in which the tape is moving, regardless of the tape speed.

It should be understood that various elements found in conventional tape recording and reproducing systems, such as, reel drive controls and mountings and recording and reproducing heads, have not been described herein in detail for simplicity since they may be of any conventional form.

During the recording mode, the system of the present invention operates to record an entire frame of the video signal in one operative semicircular sweep of each of the heads 33 or 34. To achieve this result, the rotating drum 31 is driven at a speed such that the drum 31 completes a half rotation during each frame interval of the incoming composite television signal. The tape 12 is driven at longitudinal speed which is exactly half the peripheral velocity of the drum. Therefore, during the time that one of the magnetic heads 33 or 34 has completed a 180° rotation, each point on the tape has traveled a distance equal to 90° around the radius of the drum, and the incoming television frame has been recorded on a 90° arc of tape. The next frame of the incoming video signal is then switched to the other head and is recorded in a section of tape beginning 90° behind the previous frame with the end of the frame abutting the beginning of the previous frame.

Figure 2:
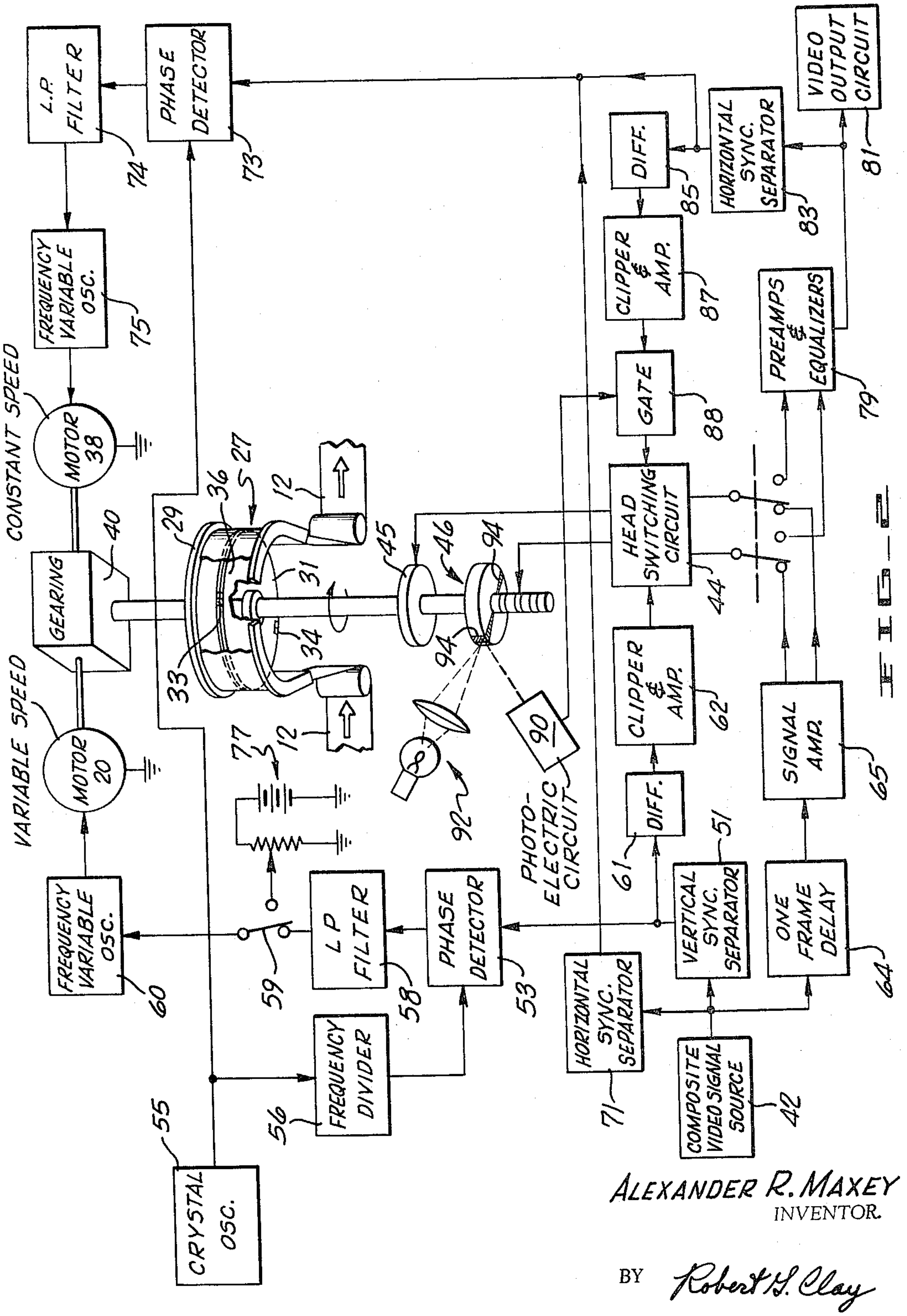
FIGURE 2 is a partial perspective and circuit diagram or a recording and reproducing system in accordance with the invention.
Figure 3:
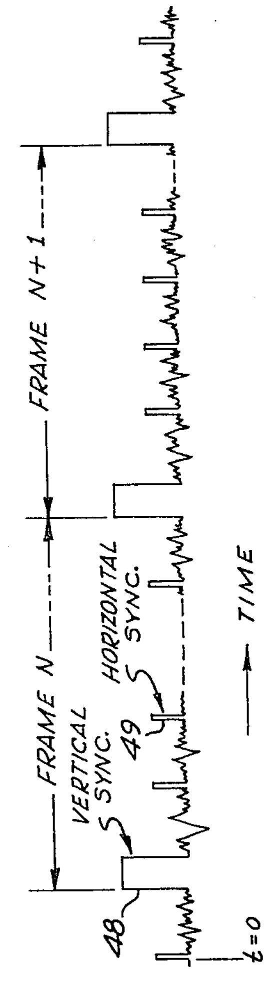
FIGURE 3 is an idealized waveform diagram of a television signal.

More particularly, referring now to FIGURE 2, a composite video input signal is received from a source 42 and coupled through head switching circuit 44 to a pair of slip ring connectors 45 and 46, which couple the input video signal to the magnetic heads 33 and 34. The video input signal from the source 42 consists, as shown in FIGURE 3, of successive frames denoted by equally spaced vertical sync signals 48, and contains equally spaced horizontal sync signals 49 dividing the frame into distinct horizontal lines. The incoming video signal from the source 42, referring again to FIGURE 2, is also applied to a vertical sync separator 51 which extracts the vertical synchronizing pulses 48 from the remainder of the composite signal, and applies these pulses to one of the inputs of a phase detector 53. A crystal oscillator 55 tuned to the frequency of the incoming horizontal synchronizing pulses 49 is connected through a frequency divider 56 to provide clock pulses which are highly time stable at the frequency of the vertical synchronizing signal to the other input of the phase detector 53. The phase detector 53 delivers an output signal through the low pass filter 58 and the switch 59 to control the frequency of a frequency variable oscillator 60 which drives the alternating current variable speed motor 20. The variable speed motor 20 drives the capstan 17 to control the longitudinal speed of the tape 12 and contributes to the speed control of the drum 31 in accordance with the frame rate of the incoming signal. Of course, it will be understood that if the composite television signal from the source 42 can be relied upon for a stable frame rate, then the variable speed motor 20 may be controlled directly from a highly stable oscillator.

The vertical synchronizing signals from the vertical sync separator 51 may be used to accurately control the timing of the head switching circuit 44, as is commonly done in transverse track television recording systems. During recording, the rotating drum 31 may be synchronized with the incoming signals so that vertical synchronizing pulses occur when both magnetic heads 33 and 34 are disposed adjacent the area of tape overlap, which preferably is as shown in FIGURE 1, on the order of 2½° of arc. This permits the signal to be switched from one head to the other during the vertical blanking interval, which prevents any loss of video signal. With the rotation of the drum 31 so synchronized, a switching pulse can be derived through the differentiating circuit 61 and the clipper and amplifier circuit 62 to operate the head switching circuit 44 at the moment of overlap. The composite video signal from the source 42 is delayed one full frame interval in the delay circuit 64 and then provided through amplifier 65 and through the double-throw switch 66 to the input of the head switching circuit 44 to be delivered to the appropriate magnetic head 33 or 34. The delay insures that switching for each frame is accomplished in accordance with the time of occurrence of the vertical synchronizing pulse for that frame, rather than being based upon the start of the vertical synchronizing pulse of the next frame.

Figure 4:
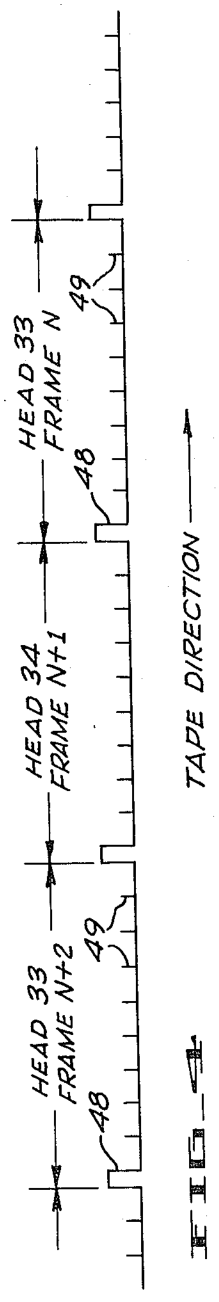
FIGURE 4 is a waveform diagram illustrating the operation of a system in accordance with the invention in recording television signals.

FIGURE 3 represents an idealized and simplified television signal in which there is only a single vertical synchronizing pulse marking the division between each pair of adjacent frames, and no field divisions. The order in which such frames are recorded upon the magnetic tape may be seen in the illustration of FIGURE 4, which shows three successive full video frames N, $N+1$ and $N+2$. It should be realized that the frames shown contain only a small number of horizontal synchronizing pulses for ease of illustration, whereas a normal frame would contain many more horizontal synchronizing pulses in accordance with the particular standard in use. As shown, head 33 receives frame N at the beginning of the vertical synchronizing pulse for that frame and records the signals in the frame by sweeping a section of the tape in the direction of tape travel until the end of the frame N is reached. Then the video input signal is switched to head 34 for the beginning of frame $N+1$, which begins with the start of a vertical synchronizing pulse at a distance equal to one recorded frame length on the tape from the starting point of the previous frame N. Head 34 then sweeps forward on the tape to record a full frame $N+1$ in the direction of tape travel, and stops recording at the point at which the preceding frame N had begun. The incoming signal is then switched back to head 33 which begins recording with a vertical synchronizing pulse of frame $N+2$. This frame is recorded in the next frame length of the tape in the direction of tape travel. Therefore, the recorded pattern on the tape is such that the successive frames are recorded in a direction opposite to the direction of tape travel, while the video signals within each frame are recorded in the same direction as the direction of tape travel.

It should be realized by those skilled in the art that the recording of the video signals need not take place on a frame-by-frame basis with the switching of the video heads being synchronized with the occurrence of the vertical synchronizing pulses. It would be possible to achieve acceptable results by recording a full frame length extending from one portion of an incoming video frame to the same point in another video frame. However, much better picture resolution can be achieved with minimum loss of the video signal when head switching is carried out in the preferred manner during the occurrence of the vertical blanking interval, so that the video signal is recorded on the tape in frames which correspond to the frames of the composite television signal.

Also during recording, the constant speed motor 38 is driven in a carefully controlled fashion by use of the horizontal synchronizing pulses from the incoming signal. A horizontal sync separator 71 delivers these pulses to one of the inputs of phase detector 73, the other input of which is connected to receive the clock pulses at the same frequency from the crystal oscillator 55. The output from the phase detector 73 is applied through a low pass filter 74 to another frequency variable oscillator 75 to control the speed of the motor 38. This motor control circuit thereby provides a fine control of the speed of rotation of the drum 31 so that the incoming signals are recorded at the proper frequency.

In accordance with the invention, the signals once recorded may be reproduced at a variable frame rate to simulate slow or fast motion by rerunning the previously recorded tape 12 past the transducer assembly 27 at a particular speed within a variable range. The switch 59 is moved to connect the variable voltage source 77 to the input of the frequency variable oscillator 60 so that the variable speed motor 20 may be driven at any desired rate. Likewise, the switch 66 is moved to the other position to connect the outputs from the head switching circuit 44 to the input of the preamplifiers and signal equalizing circuits 79 of the reproduction circuitry. The output from the preamplifier and equalizer circuit 79 is a continuous composite television signal which may be delivered to the video output circuit 81 to be displayed by a conventional television monitor or recorded by a conventional television tape recorder for future use. A horizontal sync separator 83 is connected to receive the signal from the preamp and equalizer circuit 79 and deliver the horizontal sync pulses to one input of the phase detector 73, the other input of which is connected to the crystal oscillator 55 to thereby closely control the velocity of the constant speed motor 38. The horizontal sync pulses are also applied through a differentiating circuit 85 to a clipper and amplifier circuit 87 to be delivered to the input of a normally disabled gate 88. When the gate 88 receives an enabling output from a photoconducting circuit 89, a horizontal synchronizing pulse is then delivered therethrough to the head switching circuit 44 so that the reproducing operation is switched from one head to the next.

To ensure that the head switching takes place only during the time in which the heads 33 and 34 are located in the area of tape overlap, any conventional switching means may be employed. In accordance with the illustration of the embodiment of FIGURE 2, a light beam from a source 92 is focused at a point on the rotating slip ring 46 to be reflected to the photoconducting circuit 90. Two dark sections 94 are located on the surface to absorb the light only during the time in which the heads 33 and 34 are located in the area of tape overlap, at which time an enabling pulse is delivered from the photoconducting circuit 90 to the gate 88, and the head switching is accomplished during the occurrence of the next horizontal synchronizing pulse.

Figure 5:
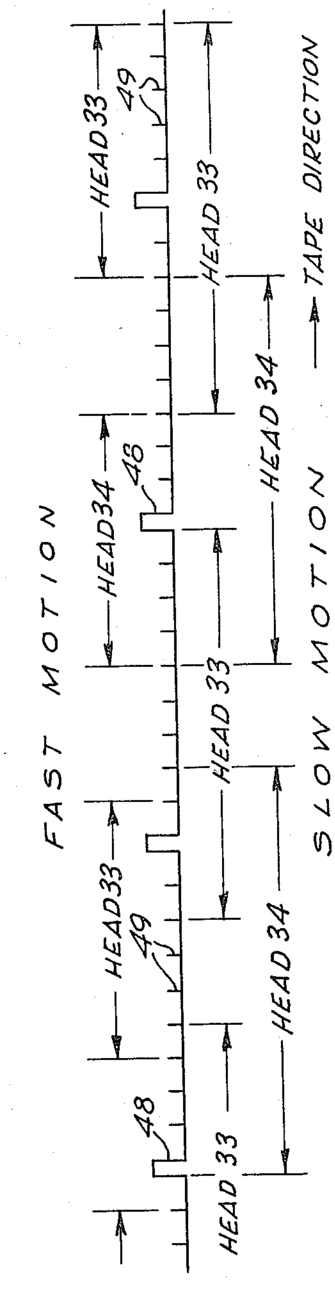
FIGURE 5 is a waveform diagram illustrating the operation of the system in accordance with the invention in reproducing recorded television signals to simulate fast or slow motion.

Referring now to FIGURE 5, the operation of the reproduction circuit may be illustrated for both fast and slow motion effects. A fast motion effect is produced by running the tape 12 at a longitudinal speed which exceeds the speed at which the video signal was originally recorded. As shown in the upper portion of FIGURE 5, in which it is assumed for simplicity only that nine lines comprise a frame and that the reproducing tape speed is 25 percent faster than the recording speed but that the differential speed remains the same, the greater tape speeds prevent one of the heads 33 and 34 from completing a full frame interval during its 180° rotation in operative contact with the tape. Starting at the right side of FIGURE 5, head 33 may be seen to sweep only a portion of a full frame beginning two horizontal synchronizing pulses before the vertical sync pulse and ending five horizontal synchronizing pulses after the vertical sync pulse, that is, only seven horizontal synchronizing pulse intervals out of the total of nine horizontal synchronizing pulse intervals, which comprise a full television frame for purposes of this illustration. When head 34 is switched on, it begins to sweep another frame at the same position five horizontal synchronizing pulse intervals after the vertical synchronizing pulse, and completes its sweep three horizontal synchronizing pulses after the vertical synchronizing pulse in the preceding frame. Head 33 is then switched on again and starts a sweep at the same point in the succeeding frame, and so on. Thus, the recorded signal is reproduced as a continuous television signal by reproducing matching portions from different frames, while still maintaining the frequency and frame length of a conventional composite television signal.

The lower portion of FIGURE 5 shows the reproduction operation for slow motion effects, assuming that the reproducing tape speed is 20 percent below the recording speed while the same relative velocity is maintained between the tape and the head. The slower speed of the tape permits the head to sweep more than a full frame interval in a 180° rotation in operative contact with the tape. Beginning on the right hand side of the drawing of FIGURE 5, head 33 begins a sweep three horizontal synchronizing pulses after a vertical synchronizing pulse and completes the sweep at a point five horizontal synchronizing pulses into the preceding frame. At this point, the heads are switched, and head 34 begins reproducing the signal from the fifth horizontal synchronizing pulse in a succeeding frame and ends the sweep with the seventh horizontal synchronizing pulse of the preceding frame, and so on. The output signal therefore contains a video signal consisting of portions of adjacent recorded frames with the same frequency and synchronizing pulse intervals as the original television signal.

As may be seen from the illustration of FIGURE 5, the fast motion effect results in certain portions of the recorded video signal not being reproduced, and the slow motion effect results in certain portions of the video signal being repeated. The reproduced television signal therefore consists of individual frames containing video signals derived from more than one recorded frame. When the reproduced signal is displayed as a television picture, there are transition points between the upper and lower parts of a picture, with the portion of the picture above the transition point representing action occurring two frame intervals ahead of the portion below. However, the picture discontinuity occurring at the transition is not evident to the viewer because of the high frame rate of conventional television systems, and also because the transition point moves uniformly through the picture height except when the motion is stopped or is reproduced at multiples of the recorded frame rate.

Among the other advantages offered by a recording and reproducing system in accordance with this invention, the frame rate may be controlled independently of the motion rate by varying the differential speed between the tape and the heads. This would permit the system to be used in a video "standards conversion" system as a part of an optical or other type converter to obtain the desired number of frames per second that might be required for conversion. For example, a tape recorded at normal speed and at a rate of 30 frames per second may be reproduced at the same tape speed, but with the heads moving more slowly, so as to give only 25 vertical synchronizing pulses or frames per second. Irregularities due to differences in resulting line rates can be minimized by other methods well known in the art. Also, picture manipulation can be accomplished by this system during recording of the incoming video signal, as well as during playback, the main difference being that the effect would be more permanent, thereby resulting in less flexibility during playback.

It should also be noted that audio frequencies recorded and played back would not shift in frequency when the same head to tape differential speed is maintained both during the recording and reproducing. However, reproduction of the audio portion would be somewhat chopped or garbled by what would be the audio equivalent of abnormal motion rates.

While the invention has been described in connection with a very simple tape transport system having supply and take-up reels and a capstan drive, the recording and reproducing system of the present invention may be advantageously combined with an endless loop magnetic tape transport. For one example, there is mentioned the device described in the inventor's copending United States patent application Serial No. 72,352 for a "Tape Transport" filed November 29, 1960, now U.S. Patent No. 3,149,201. In this manner, the video signal could be recorded and reproduced without the necessity of rewinding the previously recorded information back onto the supply reel.

Also, recording and reproducing systems in accordance with this invention may be produced by those skilled in the art by using a larger number of magnetic heads equally spaced about a rotating drum or other means to minimize the length of the section of tape which must be disposed adjacent the magnetic drum. In such system, the speed of rotation of the drum relative to the longitudinal speed of the tape would be changed so that succeeding frames would be recorded adjacent one another without overlap and without gaps therebetween.

While the invention has been particularly shown and described with reference to a preferred embodiment and a simplified exemplification of the tape transport, it will be understood by those skilled in the art that the foregoing and other changes in the form and details may be made without departing from the spirit and scope of the invention.

What is claimed is:

1. A system for recording and producing signals longitudinally on a signal recording medium comprising first means movable with respect to said medium including a plurality of transducers for making successive operative sweeps along a single predetermined longitudinal section of said medium, variable speed driving means operatively coupled to said medium and said heads for causing movement of said medium only in a predetermined longitudinal direction during recording operation and in at least said predetermined direction during reproducing operation, said variable speed driving means also causing relative movement between said medium and said heads so that in all modes of operation at least one of said transducers operatively sweeps successive longitudinal portions of the medium in a direction opposite to the spatial order in which successive sweeps are recorded on the medium, signal circuits adapted to be coupled to said transducers, and means responsive to the signals for connecting each of said transducers successively to said signal circuits during each operative sweep.

2. A system for recording and reproducing signals longitudinally on a recording medium, wherein the signals are arranged in separate frames with each frame representing a progressive change in the information contained in the preceding frame, comprising a recording medium having a longitudinal recording track, means including a plurality of transducer heads for making successive operative sweeps along portions of the longitudinal track, variable speed driving means coupled to move said medium in one longitudinal direction relative to said first named means, means coupled to said variable speed driving means for driving said transducer heads in the same direction as the magnetic medium and at a speed greater than the speed of said medium and differing therefrom by a predetermined amount so that each head operatively sweeps a longitudinal portion of the track, signal recording circuits coupled to said heads, and means responsive to the signals from said recording circuits for controlling the speed of said variable speed driving means to record a full frame of signals on the longitudinal track of the recording medium for each operative sweep of one of said magnetic heads.

3. A system for recording video signals and reproducing the video signals to simulate higher and lower speed motion, the video signal containing distinct video frames having synchronizing pulses identifying said frames, comprising a magnetic recording medium providing a continuous longitudinal recording track, magnetic head means including a plurality of magnetic heads for making successive operative sweeps in a first direction along the longitudinal track at a first predetermined recording speed, each sweep being an integral number of frames in length, driving means for driving said magnetic medium in said first direction at a second predetermined recording speed that is a fraction of said first predetermined speed and differs therefrom by a fixed differential, said fraction having as a denominator the number of magnetic heads and as a numerator the number of magnetic heads minus one, means for driving the magnetic heads at a variable reproducing speed while maintaining said fixed differential between said tape speed and said head speed, a signal input circuit, a signal output circuit, and means responsive to the synchronizing signals within each frame for connecting each of said heads successively to said input and output circuits during an operative sweep.

4. A system for recording and reproducing video signals in a longitudinal track on a magnetic tape comprising a plurality of magnetic heads, means carrying said magnetic heads for rotation so that the magnetic heads are positioned at equal angular displacements from one another, tape guide means for disposing a section of the magnetic tape adjacent the path of rotation of the magnetic heads whereby the heads operatively sweep the longitudinal track, said section of tape being at least equal to the peripheral distance between adjacent magnetic heads, means for driving the magnetic tape in a first direction at a variable speed, means for rotating the magnetic heads in said first direction at a speed that is a fixed speed above the speed of the adjacent magnetic tape, and control means responsive to the video signal to be recorded for controlling the speed of the driving means to record a single video frame as each head sweeps the adjacent section of magnetic tape, whereby the video signals within a frame are recorded in the reverse order to that in which successive frames are recorded on the longitudinal track of the magnetic tape.

5. A system for recording and reproducing video signals arranged with successive frames in a predetermined spatial order longitudinally on a magnetic tape comprising means for driving the magnetic tape longitudinally, magnetic head transducer means for moving longitudinally along a recording track on the tape, means for driving said transducer means so that said transducer means has a constant relative speed with respect to said tape in a direction opposite to said predetermined spatial order of frames, means for disposing a predetermined length of the moving tape adjacent the moving magnetic head transducer means, means for controlling the longitudinal speed of the tape so that successive frames of video signals are recorded in said order in successive positions on the tape, and reproducing means for driving the magnetic tape at a variable speed including zero speed and reverse motion, whereby said video frames may be reproduced to simulate slow, fast, stopped, or reverse motion.

6. A system for recording and reproducing successive frames of a video signal longitudinally on a magnetic tape comprising a plurality of magnetic head transducer means, means mounting said magnetic head transducer means for movement longitudinally along a recording track on the tape, tape positioning means for disposing a longitudinal section of the magnetic tape adjacent the magnetic heads, and means for controlling the longitudinal speed of the tape and the speed of the mounting means and for applying the video signals to the magnetic head transducer means to record the video signals in each frame on the tape in the direction of its longitudinal movement while recording each successive frame in the order of its occurrence in the opposite direction.

References Cited by the Examiner

UNITED STATES PATENTS 3,157,738 11/1964 Okamura ---------- 178—6.6
3,157,739 11/1964 Okamura ---------- 178—6.6

DAVID G. REDINBAUGH, *Primary Examiner.*

H. W. BRITTON, *Assistant Examiner.*